United States Patent Office 2,808,372
Patented Oct. 1, 1957

2,808,372

ELECTROLYTIC BLEACHING OF ALKARYL SULFONATES

John W. Conwell and Daniel O. Popovac, Ponca City, Okla., assignors to Continental Oil Company, Ponca City, Okla., a corporation of Delaware No Drawing. Application March 14, 1955, Serial No. 494,242

9 Claims. (Cl. 204—131)

The present invention relates to the production of neutral alkylated aryl sulfonates and relates more particularly to the production of neutralized alkylated aryl sulfonates which are substantially free of color bodies.

Sulfonation of alkaryl hydrocarbons has generally followed the procedure wherein about 1.3 to 2 parts by weight of 100 to 105 percent sulfuric acid is used per part by weight of the alkaryl hydrocarbon. Other sulfonating agents have been used but whatever agent was used the resulting mixture upon completion of the sulfonation reaction produced an off-colored sulfonate upon neutralization with a base such as sodium hydroxide. Since such colored sulfonates can only be used in a relatively few applications, various methods have been suggested for removing the color bodies. Colorless sulfonates are particularly desirable in a laundry detergent. Methods as used heretofore have involved treating aqueous solutions of metal sulfonates with hydrogen peroxide or other bleaching agent such as alkali peroxide. Other treating agents have included solutions of a metal persalt such as an alkali metal percarbonate, alkali metal perborate, or an alkali metal persulfate. In addition aqueous sulfonates have been blown with oxygen or oxidizing gas in order to improve the color of the product. None of these methods have been entirely satisfactory, generally because they have involved an undesirable expenditure of materials and time and furthermore the product so obtained has not been improved greatly in color.

It is, therefore, a principal object of this invention to provide an improved process which process obviates the disadvantages of the prior art methods. It is another object of our invention to provide an improved method of treating neutralized alkaryl sulfonic acids whereby substantially colorless sulfonates may be obtained. Further objects and advantages of the invention will become apparent from the following description.

The foregoing objects are attained by the process which involves in brief the following steps. An alkaryl hydrocarbon is reacted with a sulfonating agent such as sulfuric acid or oleum. Following sulfonation, the spent sulfonating agent is removed from the mixture comprising the sulfonic acid and spent sulfonating agent. The recovered alkaryl sulfonic acid is then neutralized with a base such as sodium hydroxide to produce sodium alkaryl sulfonate. Following neutralization the resulting mixture or slurry is subjected to electrolysis which bleaches the product.

Suitable alkaryl hydrocarbons which may be used are those obtained by the reaction of excess benzene, toluene, xylene, naphthalene or similar hydrocarbons with an alkylating agent in the presence of a Friedel-Crafts type catalyst such as boron fluoride, hydrogen fluoride, sulfuric acid etc. The alkylating agent may be a 9 to 18 carbon straight or branched chain olefin, alcohol or halide. A suitable straight chain olefin is produced from a tetradecane fraction having a boiling range of 240–260° C. which is obtained by fractionating kerosene. Branched chain olefins are preferred, however, as the alkylating agent such as the 9 to 18 carbon polymers of propylene including tripropylene, tetrapropylene, pentapropylene, hexapropylene, or mixtures thereof. Other alkylating agents that may be used include the branched chain nonyl, decyl, dodecyl, octadecyl alcohols and chlorides.

A suitable alkaryl hydrocarbon which is also available commercially in large quantities is a blend of monoalkylbenzenes sometimes called dodecylbenzene. This particular product is obtainable from Continental Oil Company under the trade name "Neolene 400." Typical physical properties of dodecylbenzene or "Neolene 400" are as follows:

| | |
|---|---|
| Specific gravity at 16° C | 0.8742 |
| Average molecular weight | 232 |
| A. S. T. M., .D–158 Engler: | |
| I. B. P _____°F__ | 535 |
| 5 _____°F__ | 545 |
| 10 _____°F__ | 550 |
| 50 _____°F__ | 560 |
| 90 _____°F__ | 580 |
| 97 _____°F__ | 592 |
| F. B. P _____°F__ | 603 |
| Refractive index at 20° C | 1.4885 |
| Viscosity at 20° C., cp | 14 |
| Bromine number | 0.16 |

The sulfonating of the alkaryl hydrocarbons may be carried out by methods well known to those skilled in the art using sulfuric acid or oleum as the sulfonating agent. Other suitable sulfonating agents which may be used include chlorosulfonic acid, sulfur trioxide etc. If desired the alkaryl hydrocarbon may be diluted with a solvent such as a mineral oil, halogenated hydrocarbon, or sulfur dioxide prior to sulfonation.

Following the sulfonation of the alkaryl hydrocarbon any spent sulfonating agent that may be present is removed from the resulting mixture. If desired the mixture prior to the removal of the spent sulfonating agent may be quenched with water, alcohol, a mixture of water and alcohol, or a mineral oil. After removing the spent sulfonating agent the concentration of the alkaryl sulfonic acid present in the residue may vary from about 50 to 95% or higher.

The sulfonic acid may be neutralized by the addition thereto of a suitable base such as an alkali metal hydroxide, carbonate or alkaline earth metal carbonate. Whichever base is used for the neutralization the resulting mixture after neutralization should have a pH within the range of about 7 to 10, preferably 7 to 8 for best results. We have found that the color of organic sulfonates which are neutral or alkaline in reaction may be improved by electrolysis while the color of organic sulfonates which are even slightly acidic (pH less than 7.0) cannot be improved by this process.

The actual voltage and the current flow used in the electrolysis reaction can be varied over a wide range. As for example, excellent results have been obtained wherein the electrolytic E. M. F. and the current density have varied from about 1 to 10 volts and from about 0.05 to about 1.5 amperes per square decimeter respectively. Variations above and below these values, however, may be used. We have found that an electrical energy of about 30 watt hours at a current density of about 0.5 to 1.5 amperes per square decimeter of electrode area will improve the color of one pound of neutral surface active organic sulfonate by one Klett color unit when the color is measured on a 10% solution of the neutral surface active salt. All Klett color determinations were made using a number 42 blue filter. As to the concentration of the organic sulfonate, that may vary from about 5 to 95%. In general the concentration is limited only by the concentration of the product desired and ease of handling the material. In some cases a 40% aqueous concentration of the sulfonate may be too viscous to obtain satisfactory mixing while the salt of another sulfonated petroleum fraction may be fluid enough for satisfactory operation at concentrations as high as 95%. As to the temperature employed during the electrolysis reaction, the solution or slurry temperature may vary from any temperature above the freezing point of the mixture to just below its boiling point. For convenience we prefer to operate within the range of about 20–60° C.

While we do not wish to be bound by any theory as to how our results are produced, we believe that the correct explanation of these results is substantially as follows: It has been observed that no sludge is formed during the electrolysis reaction and as a consequence we believe that the color bodies are converted to colorless materials by the action of nascent oxygen.

We have also found that the material of which the electrode is prepared is critical in our invention. For example, copper, monel metal and stainless steels are unsatisfactory. An inert metal such as platinum is preferred as the material of which the electrodes are constructed in order to obtain the best color improvement of the product.

In order to disclose the nature of the present invention still more clearly, the following illustrative examples will be given. It is to be understood that the invention is not to be limited to the specific conditions or details set forth in these examples except insofar as such limitations are specified in the appended claims. Parts given are parts by weight.

Example 1

One hundred parts of a 10% aqueous solution of sodium dodecylbenzene sulfonate having a Klett color of 156 and a pH of 8 was added to an electrolytic cell having a positive platinum electrode surface of 95 square centimeters . A current of 1 ampere at an E. M. F. of 10 volts was passed through the cell. During the electrolysis the temperature of the mixture was approximately 25° C. In 1 hour the Klett color was reduced to 140, in 3 hours reduced to 105 and in 5 hours reduced to 84.

The use of a higher current density resulted in reduced time requirements for attainment of equivalent color reductions.

Example 2

Example 1 was repeated with the exception that the electrolytic cell was charged with a 10% solution of sodium dodecylbenzene sulfonate which had a Klett color of 100. In 3 hours the Klett color was reduced to 56 and in 5 hours it was reduced to 24.

Examples 3 and 4

Examples 1 and 2 were repeated except potassium dodecylbenzene sulfonate was substituted for the sodium dodecylbenzene sulfonate. The results as to color reduction were equivalent to those obtained in Examples 1 and 2.

Example 5

Electrolysis of dodecylbenzene sulfonic acid followed by neutralization did not improve the color of the final product but on the contrary resulted in a darker colored product. When the dodecylbenzene sulfonic acid used in preparing the sodium dodecylbenzene sulfonate of Example 1 was treated electrolytically and then neutralized, a 10% solution of the resulting sodium dodecylbenzene sulfonate had a Klett color of about 300.

While particular embodiments of the invention have been described, it will be understood, of course, that the invention is not limited thereto since many modifications may be made, and it is therefore, contemplated to cover by the appended claims any such modifications as fall within the true spirit and scope of the invention.

The invention having thus been described, what is claimed and desired to be secured by Letters Patent is:

1. A process of bleaching a water soluble alkaryl sulfonate which comprises subjecting a solution consisting of said alkaryl sulfonate and water, the pH of said solution being at least 7, to electrolysis.

2. The process of claim 1 wherein the pH of the aqueous solution of the alkaryl sulfonate lies within the range of from about 7 to about 10.

3. The process of claim 1 wherein the pH of the aqueous solution of the alkaryl sulfonate lies within the range of from about 7 to about 8.

4. The process of claim 1 wherein the water soluble alkaryl sulfonate is dodecylbenzene sulfonate.

5. The method of claim 1 wherein the E. M. F. used during the electrolysis reaction lies within the range of from about 1 to 10 volts.

6. The method of claim 1 wherein the electrolysis reaction is carried out using a current density varying from .05 to about 1.5 amperes per square decimeter.

7. The method of claim 1 wherein the electrolysis reaction is carried out for a period varying from 1 to 5 hours.

8. The method of claim 1 wherein the electrodes used during the electrolysis reaction were constructed of an inert material.

9. The method of claim 1 wherein the electrodes used during the electrolysis reaction were constructed of platinum.

References Cited in the file of this patent

UNITED STATES PATENTS

| Number | Name | Date |
|---|---|---|
| 1,921,492 | Webber et al. | Aug. 8, 1933 |
| 2,333,830 | Toone | Nov. 9, 1943 |
| 2,681,362 | Kennedy et al. | June 15, 1954 |
| 2,683,692 | Harris | July 13, 1954 |
| 2,688,633 | Cohen | Sept. 7, 1954 |